(12) United States Patent
Ramos et al.

(10) Patent No.: US 7,949,440 B2
(45) Date of Patent: May 24, 2011

(54) AIRCRAFT CRUISE SPEED CONTROL

(75) Inventors: Domingos Candido Wong Ramos, Sao Paulo (BR); Alex Sander Ferreira Da Silva, Sao Paulo (BR); Celso Valerio Bastos Casagrande, Sao Paulo (BR); Salvatore Calandra, Montreal (CA); Keith Morgan, Montreal (CA)

(73) Assignees: Embraer-Empresa Brasileira de Aeronautica S.A., Sao Jose dos Campos (BR); Pratt & Whitney Canada Corp., Longueuil (CA)

( * ) Notice: Subject to any disclaimer, the term of this patent is extended or adjusted under 35 U.S.C. 154(b) by 80 days.

(21) Appl. No.: 12/550,878

(22) Filed: Aug. 31, 2009

(65) Prior Publication Data
US 2009/0326745 A1    Dec. 31, 2009

Related U.S. Application Data

(63) Continuation-in-part of application No. 11/615,038, filed on Dec. 22, 2006, now Pat. No. 7,774,106.

(51) Int. Cl.
*G06F 19/00* (2011.01)
*B64D 31/08* (2006.01)
(52) U.S. Cl. ............. 701/14; 701/4; 340/945; 244/75.1
(58) Field of Classification Search .................. 701/1, 3, 701/4, 10, 11, 14; 340/945, 963, 969, 973, 340/978; 244/75.1, 76
See application file for complete search history.

(56) References Cited

U.S. PATENT DOCUMENTS

| 3,638,092 | A |   | 1/1972  | Kammerer        |         |
|-----------|---|---|---------|-----------------|---------|
| 3,742,325 | A |   | 6/1973  | Andresen, Jr.   |         |
| 3,840,200 | A |   | 10/1974 | Lambregts       |         |
| 3,848,833 | A |   | 11/1974 | Rauschelbach    |         |
| 3,880,385 | A |   | 4/1975  | Reynolds et al. |         |
| 3,887,148 | A |   | 6/1975  | Devlin          |         |
| 4,043,526 | A |   | 8/1977  | Donley et al.   |         |
| 4,205,814 | A |   | 6/1980  | Larson et al.   |         |
| 4,357,663 | A |   | 11/1982 | Robbins et al.  |         |
| 4,467,429 | A |   | 8/1984  | Kendig          |         |
| 4,471,439 | A |   | 9/1984  | Robbins et al.  |         |
| 4,488,236 | A | * | 12/1984 | Morrison et al. | 701/123 |
| 4,490,793 | A | * | 12/1984 | Miller          | 701/3   |
| 4,536,843 | A |   | 8/1985  | Lambregts       |         |
| 4,569,021 | A |   | 2/1986  | Larson et al.   |         |
| 4,589,616 | A |   | 5/1986  | Zweifel         |         |
| 4,599,698 | A |   | 7/1986  | Fischer et al.  |         |
| 4,609,988 | A |   | 9/1986  | Zweifel         |         |
| 4,641,268 | A | * | 2/1987  | Zweifel et al.  | 701/121 |
| 4,686,825 | A |   | 8/1987  | Cavasa et al.   |         |
| 4,767,085 | A |   | 8/1988  | Boudreau et al. |         |
| 4,912,642 | A |   | 3/1990  | Larsen et al.   |         |

(Continued)

FOREIGN PATENT DOCUMENTS
EP    0030066    9/1984
(Continued)

*Primary Examiner* — Thomas G Black
*Assistant Examiner* — Ce Li
(74) *Attorney, Agent, or Firm* — Ogilvy Renault LLP

(57) ABSTRACT

The present invention provides an alternative to the auto-throttle integrated in an aircraft autopilot by restricting the conditions in which the system operates. The proposed system removes the auto-throttle function from the autopilot system and gives it directly to the Full Authority Digital Engine Control (FADEC). A cruise control mode is available to the pilot only under stable flight conditions.

10 Claims, 4 Drawing Sheets

U.S. PATENT DOCUMENTS

| | | | |
|---|---|---|---|
| 5,029,778 A | | 7/1991 | DeLuca |
| 5,031,102 A | * | 7/1991 | Robbins et al. ............... 701/5 |
| 5,078,345 A | | 1/1992 | De Vries et al. |
| 5,517,819 A | | 5/1996 | Martin |
| 5,615,118 A | * | 3/1997 | Frank ............... 701/4 |
| 5,833,177 A | | 11/1998 | Gast |
| 5,836,546 A | | 11/1998 | Gast |
| 5,908,176 A | | 6/1999 | Gilyard |
| 5,978,715 A | * | 11/1999 | Briffe et al. ............... 701/11 |
| 6,186,447 B1 | | 2/2001 | Virdee |
| 6,578,794 B1 | | 6/2003 | Clark et al. |
| 2003/0034902 A1 | * | 2/2003 | Dickau ............... 340/945 |
| 2003/0206119 A1 | * | 11/2003 | Riley ............... 340/963 |
| 2009/0008510 A1 | * | 1/2009 | Posva ............... 244/7 R |
| 2009/0157239 A1 | * | 6/2009 | Walton et al. ............... 701/6 |

FOREIGN PATENT DOCUMENTS

| | | |
|---|---|---|
| EP | 0120855 | 1/1989 |
| EP | 0122718 | 1/1989 |
| EP | 0444541 | 8/1995 |
| GB | 1435201 | 5/1976 |
| GB | 1435202 | 5/1976 |
| GB | 1435203 | 5/1976 |

* cited by examiner

AIRCRAFT CRUISE SPEED CONTROL

CROSS-REFERENCE TO RELATED APPLICATIONS

This is application is a continuation-in-part of U.S. patent application Ser. No. 11/615,038 filed Dec. 22, 2006, the entire specification of which is incorporated herein by reference.

TECHNICAL FIELD

The invention relates generally to aircraft control systems and, more particularly, to controlling an aircraft flight speed.

BACKGROUND OF THE ART

The Full Authority Digital Engine Control (FADEC) is an electronic system used for controlling aircraft engine performance. The FADEC receives a signal from the throttle lever or the autopilot system and, among other things, digitally calculates and precisely controls the fuel flow rate to the engines providing precise thrust.

An autopilot system generally automates the aircraft handling during take-off, ascent, level, descent, approach and landing phases of flight. Typical autopilot systems incorporate an auto-throttle for controlling the speed of the aircraft. An autopilot system is complex and expensive and is submitted to very high reliability standards as malfunction can impact safety.

Accordingly, there is a need for an aircraft control system with reduced complexity.

SUMMARY

In one aspect the invention provides methods for controlling the flight speed of engine-propelled aircraft. The methods may be implemented by computerized control systems, such as flight control systems comprising FADECs. In various embodiments such methods comprise receiving a cruise control request signal for engaging a cruise control mode of operation of the engine; receiving a flight stability condition signal indicative of whether a flight stability condition is met, wherein the flight stability condition is met when the aircraft is in a stable flight path and in one of flight level transition and final approach; activating the cruise control mode upon receipt of the cruise control request signal and when the flight stability condition is met; receiving a flight speed signal indicative of the flight speed; and in the cruise control mode, automatically adjusting only a thrust setting of the engine within a given range according to the flight speed signal to maintain the flight stability condition.

In a further aspect the invention provides flight speed control systems for controlling the flight speed of engine propelled aircraft. In various embodiments such systems can comprise a first input for receiving a cruise control request signal for engaging a cruise control mode of operation of the engine; a second input for receiving a flight stability condition signal indicative of whether a flight stability condition is met, wherein the flight stability condition is met when the aircraft is in a stable flight path and in one of flight level transition and final approach; a logic circuit for activating a cruise control mode upon receipt of the cruise control request signal and when the flight stability condition is met; a third input for receiving a flight speed signal indicative of the flight speed; and an engine controller in the cruise control mode configured for adjusting only a thrust setting of the engine within a given range according to the flight speed signal to maintain the flight stability condition while in the cruise control mode.

Further details of these and other aspects of the present invention will be apparent from the detailed description and figures included below.

DESCRIPTION OF THE DRAWINGS

Reference is now made to the accompanying Figures, in which.

DETAILED DESCRIPTION

Figure 1:
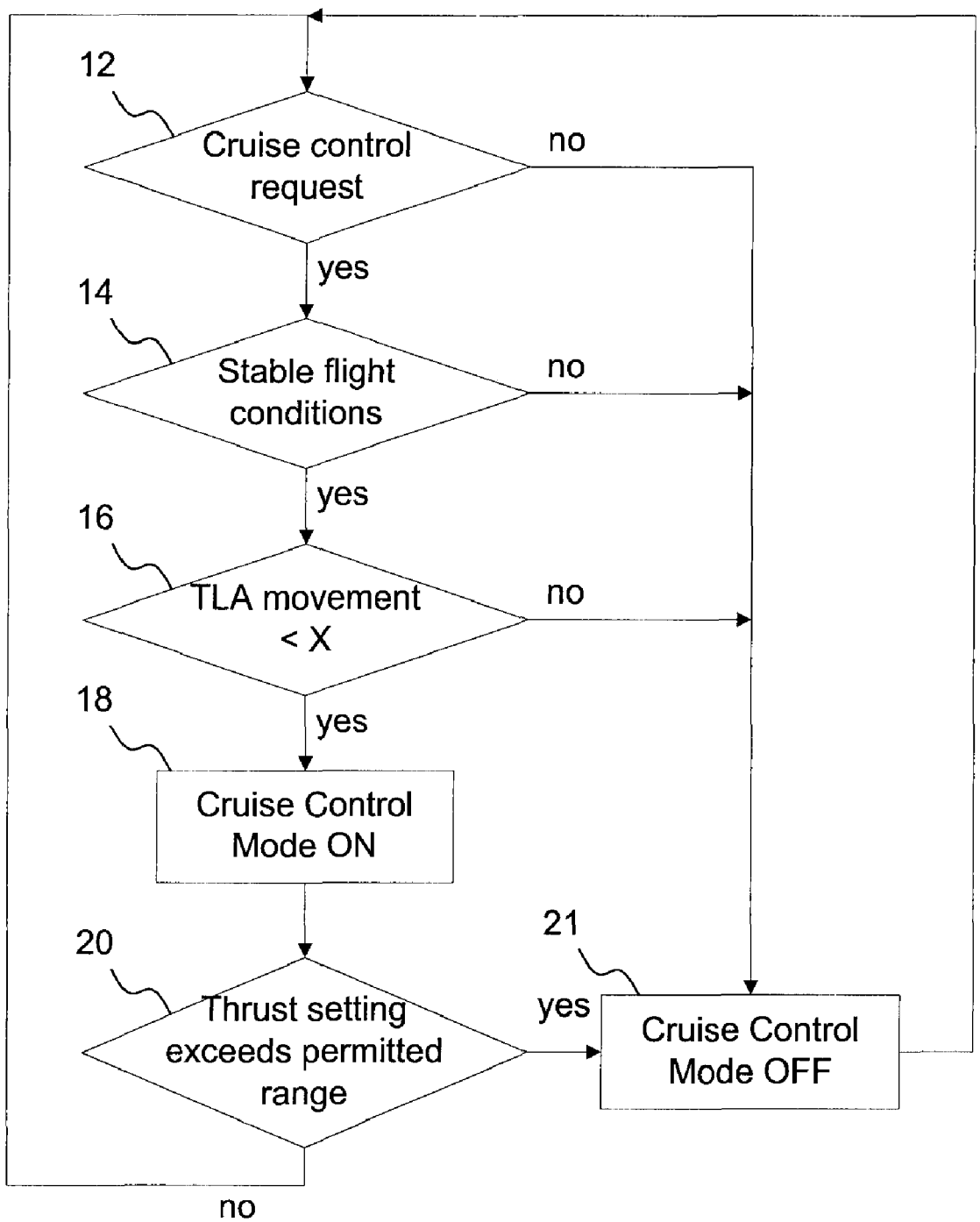
FIG. 1 is a flow chart illustrating cruise control logic, according to one embodiment of the invention.

FIG. 1 illustrates the behavior of the Cruise Control Logic (CCL). The pilot engages cruise control by activating a Cruise Control request, i.e., selecting "cruise control ON", in step 12. The Full Authority Digital Engine Control (FADEC) then engages cruise control mode in step 18 if and only if certain aircraft flight conditions, altitude and attitude for example, are stable (step 14) and, optionally, the pilot thrust instruction is stable (step 16), i.e., Throttle Lever Angle (TLA) movements do not exceed a specified amount.

In cruise control mode (step 18), the FADEC system modulates the engine fuel flow, by controlling the throttle position, to substantially maintain the flight speed constant. The authority of modulation is sized to allow a reasonable period for unattended throttle operation, but is not intended to maintain speed throughout the entire flight.

While cruise control mode (step 18) is activated, a misalignment of thrust setting-to-throttle lever angle may gradually grow until the authority assigned to the CCL is no longer adequate to maintain the target speed, i.e. the thrust setting exceeds the given permitted range (step 20). At this point, the cruise control mode is deactivated (step 22) and the pilot needs to readjust the throttle and reactivate the cruise control. The cruise control mode can be deactivated by either one of the following conditions: the pilot switches cruise control OFF, flight conditions are no longer stable, throttle lever has been moved or a throttle movement is applied beyond the amount equivalent to the authority of the CCL. Alternatively, some of these deactivation conditions can be omitted.

Figure 2:
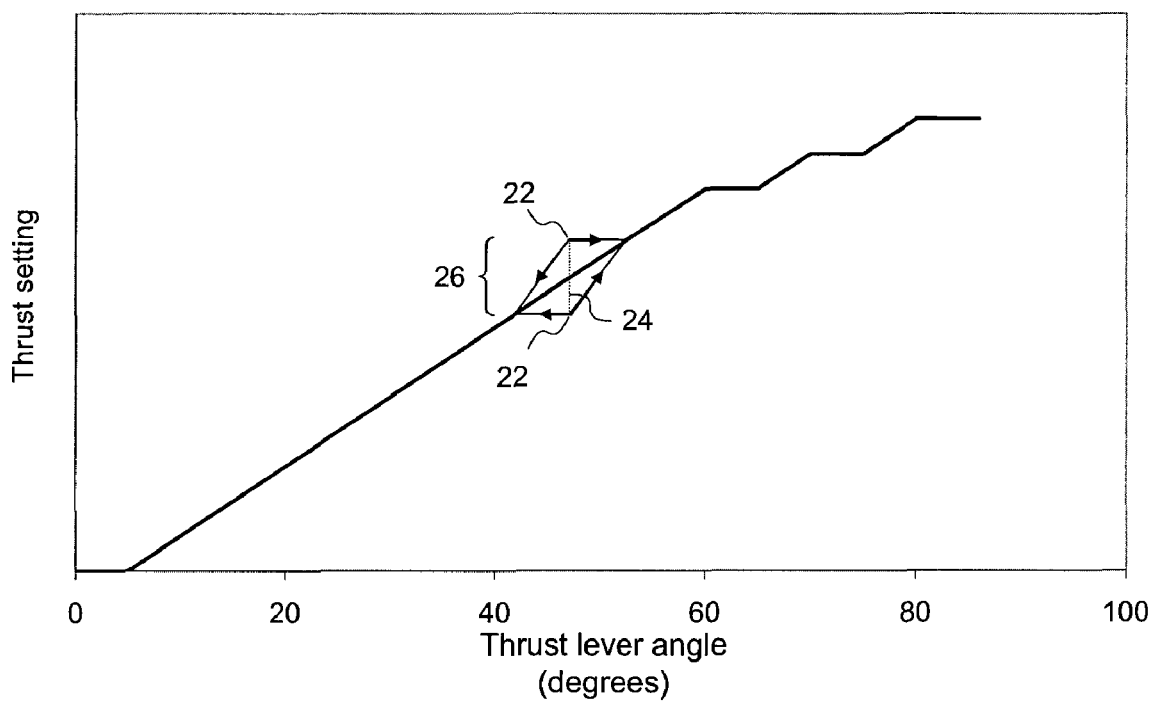
FIG. 2 is a graph illustrating the authority of a cruise control system in accordance with the relation between the throttle lever angle and the corresponding thrust setting.

FIG. 2 shows the relation between the throttle lever angle and the corresponding thrust setting used by the FADEC to control fuel flow. In cruise control mode, the throttle lever angle remains unchanged, unless the pilot applies a movement to the throttle lever to deactivate the cruise control mode, while the throttle position, and accordingly the corresponding thrust setting, is adjusted to maintain a constant flight speed. A misalignment of thrust setting-to-throttle lever angle relation thus gradually grows. Since the authority of the cruise control logic is limited to relatively narrow fluctuations, the cruise control mode is deactivated when the misalignment reaches a given limit 22, i.e. when the throttle position goes beyond a given range 24. In order to smoothly exit from the cruise control mode and return to pilot control with monotonic throttle movements, a reset dead band 26 is integrated to the system. The reset dead band 26 provides a path to return to the thrust setting-to-throttle lever angle curve when exiting the cruise control mode.

Figure 3:
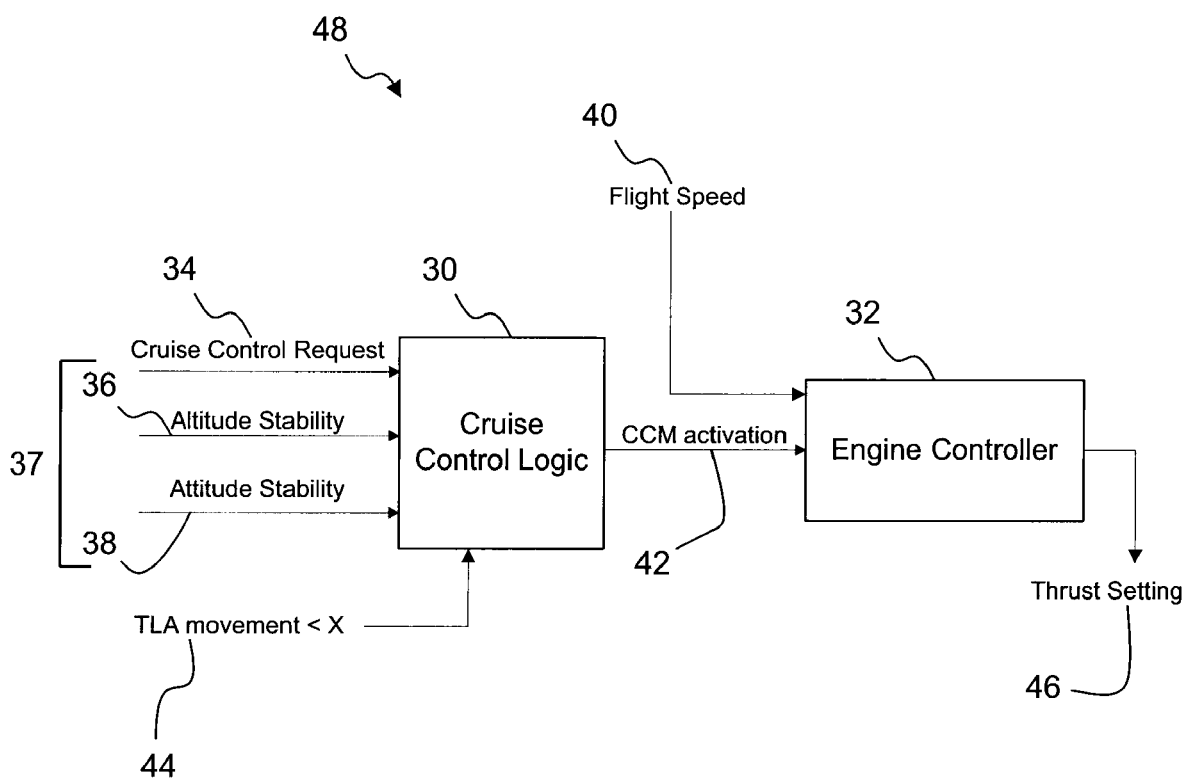
FIG. 3 is a block diagram of a flight speed control system.

FIG. 3 show an embodiment of the flight speed control system 48 which controls the flight speed of an aircraft. The flight control system 48 comprises a first input for receiving a cruise control request signal 34 for engaging a cruise control mode of operation of the aircraft engine. The flight control system 48 further comprises a second input for receiving a flight stability condition signal 37 indicative of whether a flight stability condition is met. In the embodiment shown in FIG. 3, flight stability condition signal comprises both an altitude stability signal 36 and an attitude stability signal 38. The flight control system 48 further comprises a logic circuit for activating a cruise control mode, and hence for producing a cruise control mode (CCM) activation signal 42, upon receipt of the cruise control request signal 34 and when the flight stability condition is met. The flight control system 48 also comprises a third input for receiving a flight speed signal 40 indicative of the flight speed of the aircraft. Finally, the flight control system 48 comprises an engine controller 32 for adjusting a thrust setting 46 of the engine within a given range according to the flight speed signal 40 to maintain the flight speed substantially constant while in the cruise control mode. Alternatively, the flight control system 48 comprises a fourth input for receiving a signal indicative of a stability of a pilot thrust instruction 44. The stability of the pilot thrust instruction acting as a further condition for activating the cruise control mode. In an embodiment, the pilot thrust instruction is the throttle lever angle.

In addition or in the alternative to the "altitude hold" mode described above, in another example of the present arrangement there is provided a cruise speed control system with "vertical active" modes in which stability requirements are defined to provide, for example, a constant approach speed, or constant rate of descent or other requirement, as discussed further out below. Unlike cruise, pilot workload is high during landing approach, particularly in modulating the engine thrust required to stay on a desired glide path or vertical approach speed while other aircraft systems are readied for landing. By allowing for simplified FADEC control of thrust on approach when certain preconditions are satisfied, the present cruise speed control system can allow the pilot to focus attention on other aspects of approach while approach speed is automatically regulated, as will now be described.

Figure 4:
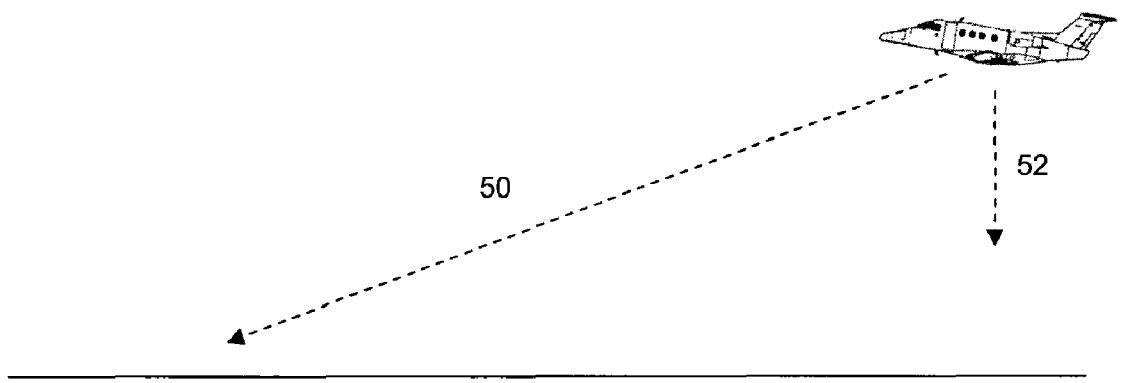
FIG. 4 is a schematic of an aircraft incorporating the present system.

As described above, when in the altitude hold mode the cruise speed control system commands the engine FADECs (within an operating range) to hold the selected cruise speed. Alternately, when in a vertical active mode (except speed on elevator), the cruise speed control system commands the engine FADECs to automatically maintain the desired speed, while on a stabilized slope or path during any flight level transition, as well as during final approach, as for example, to maintain a desired glide path 50 or vertical approach speed 52 (see FIG. 4). The path may be pre-selected, e.g. such as an Instrument Landing System (ILS) glide slope or Wide Area Augmentation System (WAAS) glide path, or another path which, for example, accounts for a higher speed if turbulence or high winds are present, or air traffic control so instructs, and so on.

Accordingly, referring again to FIG. 1, a cruise control request 12 is set when a specified set of conditions is established, such as when a pilot request is received. Flight stability requirements are met (14) in this example when a specified set of conditions have been established and maintained, such as constant glide slope condition and/or a constant vertical speed condition during final approach, or any other stabilized aircraft path during any flight level transition. Any suitable parameters may be polled or computed, etc. to allow the control system to monitor the condition(s). Thrust Lever Angle (TLA) movement is periodically or continuously checked (16) to verify that TLA is within 2 degrees of the original TLA when the cruise speed control was engaged.

Selection of suitable glide slope/path may be set either by the pilot or the aircraft's navigation computer. In the case of an ILS approach, the path is typically determined by the ILS ground-based system. The aircraft is set on the desired slope first before engaging the cruise speed control system, and may be set on the slope by the pilot manually or automatically by the aircraft's computer system. As mentioned, the cruise speed control system will automatically check, prior to engagement, to determine whether the aircraft is on a stable path.

If any of these conditions is not met, the cruise speed control is not activated, and a "fail" flag may be set, and a corresponding indication displayed in the cockpit. The cruise speed control is likewise set to disengage upon the satisfaction of a suitable conditions(s), such as when any of the above conditions is no longer satisfied. Upon deactivation, a suitable indication may be displayed in the cockpit.

Once activated, in this example, the cruise speed control function controls the airspeed of the aircraft by augmenting the engine speed (N1) control reference within the FADEC. Hence the control system polls parameters such as aircraft speed, rate of descent, etc. (as the case may be) during operation, computes necessary changes to aircraft speed in order to stay within control parameters, and then biases the FADEC N1 signal (which is, basically, a control signal in the FADEC which determines engine speed) as appropriate, e.g. to increase N1 or decrease N1 if need be, in order to maintain the aircraft within cruise control parameters. The N1 augmentation command authority may be limited, as desired. For example, N1 augmentation authority may be limited to ±15% N1 during normal aircraft operation.

In the event of disengagement of the cruise speed control function, the existing N1 augmentation command is faded out according to the reset dead band 26 described above. For example, N1 augmentation may be faded out linearly over 2 seconds if the disengagement occurred due to a failure in the function or a pilot disengage request received. In another example, N1 augmentation may be kept constant while the TLA is moving and then faded out linearly over 2 seconds after TLA has remained within +/−0.02 deg for a specified period of time, if the function disengages because of a TLA movement above the desired threshold. An example TLA threshold is +/−2 degrees.

Depending on the requirement desired to be met, the cruise speed control may have any suitable set of conditions for engagement/disengagement, including more, less or different conditions than those specified in this example.

Figure 5:
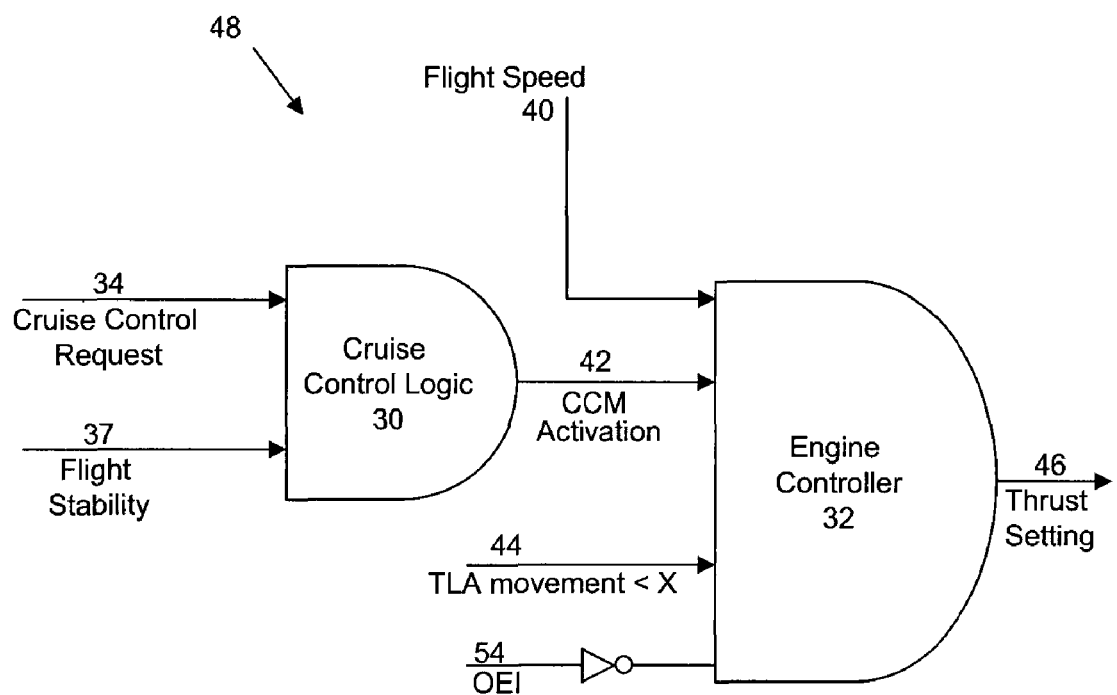
FIG. 5 is similar to FIG. 3, depicting another example.

In use, referring to FIG. 5, when cruise speed control is requested by the pilot on landing approach, a cruise control request signal 34 for engaging a cruise control mode of operation of the aircraft engine is received by the flight control system 48. Flight stability requirements are then verified and, if present, a flight stability signal 37 indicative of whether a flight stability condition is met is received by the flight control system 48. In the embodiment shown in FIG. 5, the flight stability condition signal comprises one or more signals indicating the aircraft is on a constant glide slope, or has a constant approach speed, or both, as desired. The flight control system 48 further comprises other features already described above.

When a request is received, other requirements for cruise control enablement are required 40, such as whether the aircraft is on the ground, whether the aircraft air speed (e.g. calibrated air speed, Mach number, etc.) is within an allowable range, the engine N1 reference is within allowable limits for cruise speed control operation, and whether there is any previous cruise control action still being executed, such as a dead band reset activity (described above) from a previous cruise control system activation. Whether these requirements exist may be determined in any suitable manner and by any suitable portion of the overall control system. As described with respect to the first example above, once all conditions are verified, the engine controller 32 adjusts the thrust setting 46 of the engine (e.g. by suitable augmenting N1, or by other suitable method) within a given range according to the flight speed signal 40 to maintain the desired flight characteristic, such as glide path, vertical approach speed, etc. substantially constant while in the cruise control mode.

Allowable N1 limits for control authority may be any suitable. For example a lower N1 limit may be 5% above engine idle N1. The N1 upper limit may be fixed or may vary depending on the current portion of the flight cycle. For example, in a constant altitude mode during twin-engine operation, the upper N1 limit may be set to maximum cruise N1, whereas in any other flight mode the upper N1 limit may be set to the maximum climb N1. This may be used to place limits on the authority of the cruise speed control system. As discussed, the limited authority of the cruise speed control system provides an arrangement which is beneficial to pilots and yet still allows for a simple control system which is relatively inexpensive and easy to certify as airworthy.

Referring again to FIG. 5, in another aspect the present arrangement provides a cruise speed control system which may be operated in a one-engine inoperative (OEI) situation, i.e. when one engine is shut down in flight, and the aircraft is powered only by the other engine. OEI mode may be engaged manually by the pilot, or automatically when FADEC senses an OEI event has occurred (e.g. one engine is above idle speed and the other engine is not) while the cruise control system is already engaged, or in any other suitable manner.

In OEI operation, the cruise speed control operates substantially as described above, however, since only half of the engine power is now available to the pilot (i.e. because only one engine is providing thrust), in this example of the N1 augmentation command authority is be doubled relative to the authority available during normal twin engine operation (e.g. in this example, ±30% N1), to allow sufficient authority to maintain the aircraft within the desired cruise control parameters. The system may of course be adapted to any suitable multi-engine arrangement.

The system described herein offer an alternative to the auto-throttle integrated in an aircraft autopilot system by restricting the conditions in which the system operates. The proposed system removes the auto-throttle function from the autopilot system, and hence the aircraft speed control, and gives it directly to the Full Authority Digital Engine Control (FADEC). Cruise Control Logic (CCL) is incorporated into the FADEC. Cruise Control Mode (CCM) is available to the pilot only when stable flight conditions are communicated to the FADEC.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A method for controlling a flight speed of an engine propelled aircraft, the method comprising:
   in a computerized control system:
      receiving a cruise control request signal for engaging a cruise control mode of operation of the engine;
      receiving a flight stability condition signal indicative of whether a flight stability condition is met, wherein the flight stability condition is met when the aircraft is in a stable flight path and in one of flight level transition and final approach;
      activating the cruise control mode upon receipt of the cruise control request signal and when the flight stability condition is met;
      receiving a flight speed signal indicative of the flight speed; and
      in the cruise control mode, automatically adjusting only a thrust setting of the engine within a given range according to the flight speed signal to maintain the flight stability condition.

2. The method as claimed in claim 1, wherein the step of adjusting the thrust setting includes the step of adjusting an engine speed (N1) signal within an engine control system of the aircraft.

3. The method as claimed in claim 2, further comprising deactivating the cruise control mode when flight stability condition is no longer met, and wherein the step of deactivating includes smoothly fading out any N1 signal adjustment to zero.

4. The method as claimed in claim 3, wherein the adjustment is faded out linearly over 2 seconds if the disengagement occurred due to a failure in the function or a pilot disengage request received.

5. The method as claimed in claim 3, wherein thrust lever angle is moving when the at least one stability criterion is no longer met, and wherein the step of deactivating includes keeping any N1 adjustment substantially constant while the thrust lever angle is moving and then fading out any N1 signal adjustment to zero once thrust lever angle movement substantially ceases.

6. The method as claimed in claim 1, wherein the aircraft has a plurality of prime mover engines, the method further comprising entering an OEI mode when one of the engines is inoperative, wherein in said mode said thrust setting given range is increased for a remainder of the plurality of engine.

7. The method as claimed in claim 6, further comprising receiving an OEI signal indicative of said engine being inoperative and wherein the OEI mode is entered automatically upon receipt of the OEI signal.

8. A flight speed control system for controlling a flight speed of an engine propelled aircraft, the system comprising:
   a first input for receiving a cruise control request signal for engaging a cruise control mode of operation of the engine;
   a second input for receiving a flight stability condition signal indicative of whether a flight stability condition is met, wherein the flight stability condition is met when the aircraft is in a stable flight path and in one of flight level transition and final approach;
   a logic circuit for activating a cruise control mode upon receipt of the cruise control request signal and when the flight stability condition is met;
   a third input for receiving a flight speed signal indicative of the flight speed; and
   an engine controller in the cruise control mode configured for adjusting only a thrust setting of the engine within a given range according to the flight speed signal to maintain the flight stability condition while in the cruise control mode.

9. The flight speed control system as claimed in claim 8, wherein the logic circuit includes an apparatus for adjusting an engine speed (N1) signal in the engine controller.

10. The flight speed control system as claimed in claim 8, wherein the aircraft has a plurality of prime mover engines, the system further comprising a fourth input for receiving a OEI-engine inoperative signal, and wherein the upon receipt of such signal the engine controller is configured to increase said thrust setting given range for a remainder of the plurality of engines.

\* \* \* \* \*